United States Patent [19]

Clausen et al.

[11] 4,186,648

[45] Feb. 5, 1980

[54] ARMOR COMPRISING BALLISTIC FABRIC AND PARTICULATE MATERIAL IN A RESIN MATRIX

[76] Inventors: Carol W. Clausen; Eugene J. Davis, both of 1715 E. Florence, Los Angeles, Calif. 90001

[21] Appl. No.: 901,327

[22] Filed: May 1, 1978

Related U.S. Application Data

[63] Continuation-in-part of Ser. No. 804,230, Jun. 7, 1977, abandoned.

[51] Int. Cl.² .......................... B32B 5/28; F41H 1/02; F41H 5/00
[52] U.S. Cl. ........................................ 89/36 A; 2/2.5; 2/412; 109/49.5; 109/80; 109/81; 109/82; 428/240; 428/241; 428/242; 428/252; 428/911
[58] Field of Search ............... 428/911, 242, 240, 241, 428/252, 325, 328, 329, 331; 2/2.5, 412; 89/36 D, 36 R, 36 A, 36 Z, 36 N, 36 F, 36 H; 109/49.5, 80, 81, 82

[56] References Cited

U.S. PATENT DOCUMENTS

| | | | |
|---|---|---|---|
| 2,391,353 | 12/1945 | Sheridan | 89/36 A |
| 2,738,297 | 3/1956 | Pfistershammer | 89/36 A |
| 2,758,952 | 8/1956 | Toulmin | 89/36 A |
| 2,806,509 | 9/1957 | Bozzacco et al. | 109/80 |
| 3,351,374 | 11/1967 | Forsyth et al. | 109/49.5 |
| 3,398,406 | 8/1968 | Waterbury | 2/2.5 |
| 3,431,818 | 3/1969 | King | 89/36 A |
| 3,444,033 | 5/1969 | King | 89/36 A |
| 3,649,426 | 3/1972 | Gates | 89/36 A |
| 3,828,699 | 8/1974 | Bowen | 89/36 A |
| 3,916,060 | 10/1975 | Fish et al. | 89/36 A |
| 3,958,276 | 5/1976 | Clausen | 2/2.5 |
| 3,969,563 | 7/1976 | Hollis | 89/36 A |
| 4,061,815 | 12/1977 | Poole | 89/36 R |

FOREIGN PATENT DOCUMENTS 2035953  2/1972  Fed. Rep. of Germany .......... 89/36 A

*Primary Examiner*—J. C. Cannon
*Attorney, Agent, or Firm*—Georges A. Maxwell

[57] ABSTRACT

An armor wall structure comprising a plurality of woven fabric laminates of polyester resin fibres arranged and supported in and by a supportive resinous matrix with a filler of particulate metal abrading material, said matrix, filler of particulate metal abrading material, and woven fabric laminates cooperating with each other to establish a structurally stable unitary armor wall structure.

19 Claims, 12 Drawing Figures

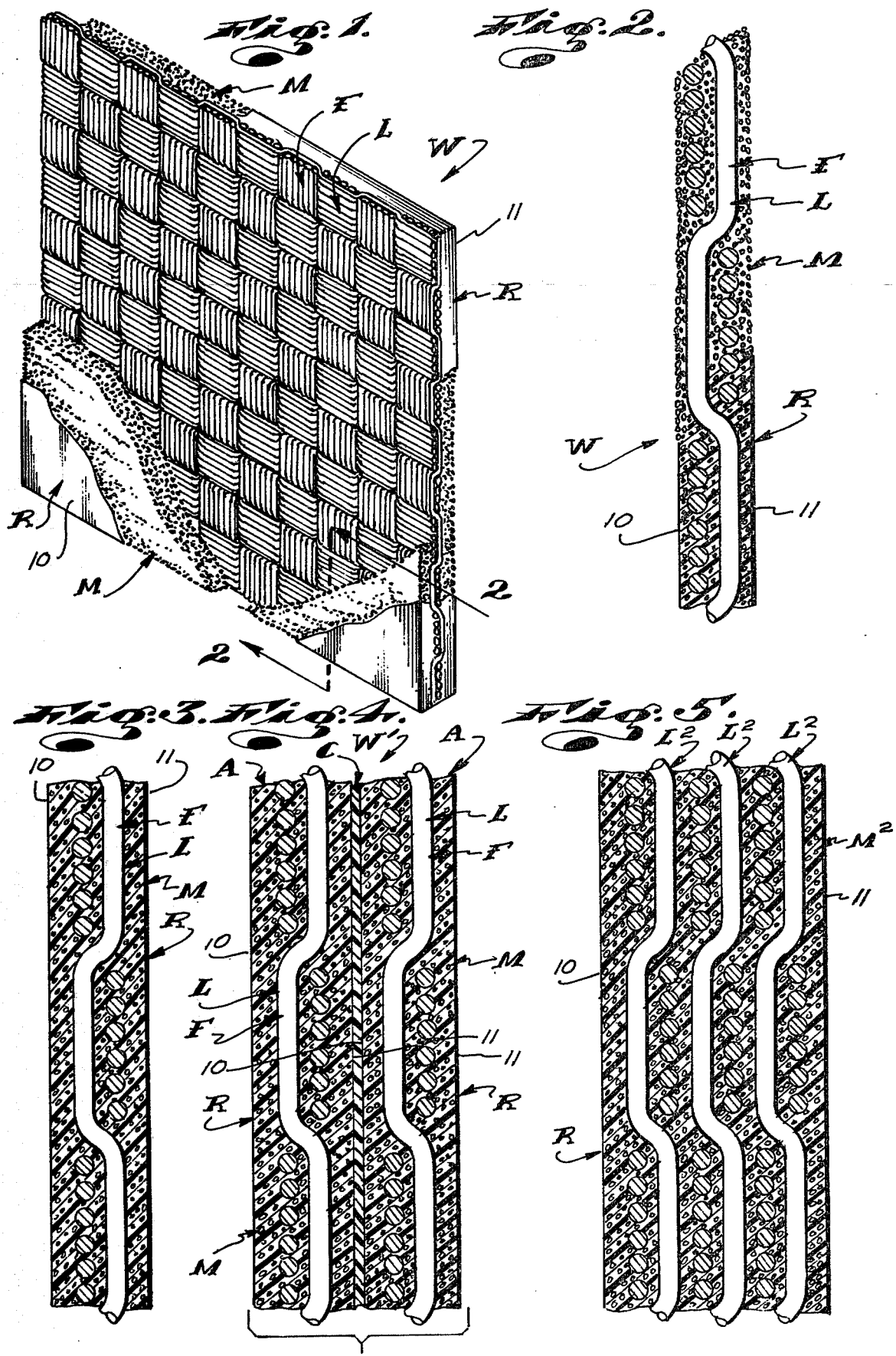

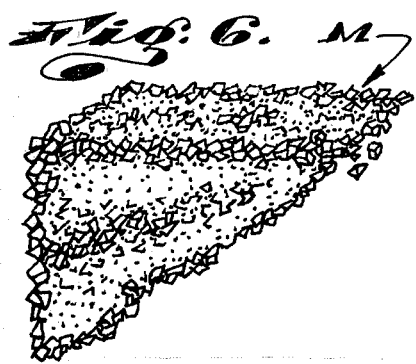
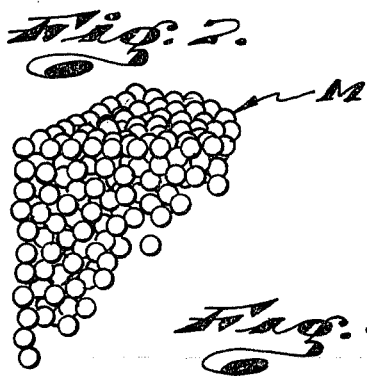
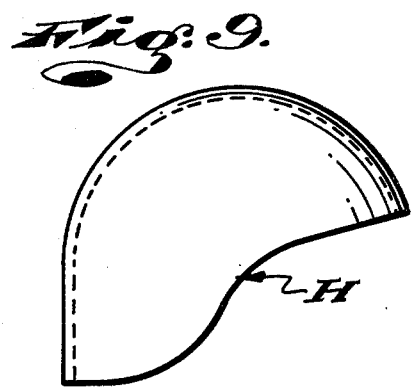
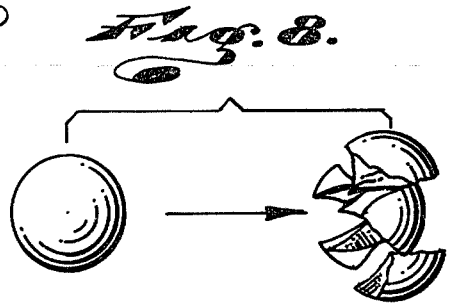
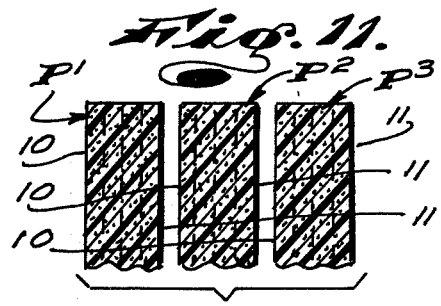
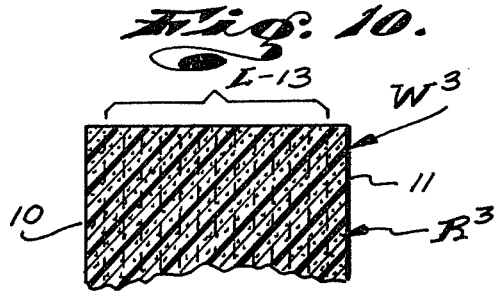
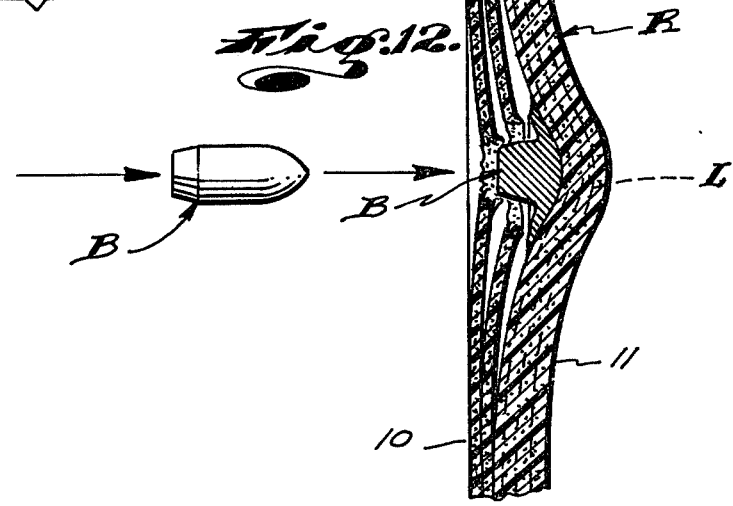

ARMOR COMPRISING BALLISTIC FABRIC AND PARTICULATE MATERIAL IN A RESIN MATRIX

This is a continuation-in-part of copending application for U.S. Patent Ser. No. 804,230, filed June 7, 1977, for "ARMOR", and now abandoned.

This invention has to do with improvements in that general class of armor barrier or wall structure which includes pluralities of layers of fabric having notable ballistic characteristics; that is, fabric possessing a notable ability to slow and/or stop projectiles, such as bullets and shrapnel, traveling at high velocity, which strike or impinge upon a surface thereof.

In recent years, certain long-chain polyester resin fibres have been developed which, when suitably woven into fabric, establish fabrics with notable ballistic characteristics. Such fabrics are frequently qualified as and referred to or called "ballistic fabrics" throughout this disclosure.

In the art to which our invention relates, it has been generally believed and understood that in armor, comprising or including laminated ballistic fabric of the character referred to above, the ballistic fabric must be loosely supported and left free to move a substantial extent upon engagement and in advance of impinging projectiles in order to gain or obtain satisfactory ballistic or projectile stopping effects therewith.

As a result of the above, laminated ballistic fabric armor provided by the prior art has most commonly consisted of a multiplicity of loosely related layers of ballistic fabric establishing thick, soft and flexible pad-like barrier structures which are oftentimes difficult to handle and/or retain. In such armor structures, special means or structures are commonly required to retain and support the soft, flexible, loosely assembled laminated fabric pad-like structures.

In the invention disclosed in our above identified copending application, we disclose armor of laminated ballistic fabric in combination with metal abrading means comprised of metal abrading particulate matter. The metal abrading means serves to abrade and condition the surfaces of projectiles as they advance into engagement with the armor and as they advance through layers of the fabric thereof so that the fibres of the fabric will better and more effectively engage the surfaces of the projectiles and stop them.

In the invention disclosed in our above identified copending application, the particulate material is retained and/or held in operative relationship with the ballistic fabric laminates by suitable cements or resins applied to the fabric or, is carried by separate resin or plastic laminates arranged in front or in advance of the fabric laminates.

In certain embodiments of the invention disclosed in our copending application, the metal abrading means and a limited number of the ballistic fabric laminates going to make up the armor are combined with and bonded in a plastic or resinous matrix. In those embodiments of the invention, a suitable number of loosely related ballistic fabric laminates of ballistic fabric are provided rearward of or behind the matrix supported laminates. The foregoing relationship of parts was disclosed because at the time of filing our above identified copending application, it appeared that a substantial amount of loosely supported ballistic fabric would likely be required to attain effective and desired ballistic or projectile stopping effect. That is, with the ballistic fabric then available and at hand, satisfactory and effective ballistic effect could not be consistently attained with a structure wherein all of the fabric and metal abrading particulate matter were bonded and held securely within a plastic or resinous matrix.

In early experiments and test, using certain available ballistic fabrics, it appeared that when the fabric laminates going up to make an armor structure were held firmly and substantially unyieldingly in a rather stiff and dimensionally stable matrix, the ballistic characteristics of the fabric were materially adversely affected. The adverse effects then recognized were such that to gain desired ballistic characteristics in such armor structure, the number of fabric laminates and resulting bulk and weight of the armor structure would have to be increased to impractical limits.

Since filing out above identified copending application, new and improved ballistic fabrics have become available and have been tested. With these new fabrics highly effective and dependable armor, comprising a limited number of ballistic fabric laminates and particulate metal abrading material in dimensionally stable plastic matrices have been produced. These new armor structures, in certain instances, require fewer fabric laminates than were required in our earlier armor structures to attain comparable ballistic effect. These new armor structures establish the fact that the inclusion of loosely related laminates of ballistic fabric in such armor is not, in many instances, required.

In addition to the foregoing, certain new particulate materials have been tested and found to be highly effective in establishing metal abrading means in our new armor.

An object and feature of our invention is to provide an improved armor structure comprising a plurality of ballistic fabric laminates and particulate metal abrading material bonded within and carried by a resinous matrix.

It is an object and feature of our invention to provide an armor structure of the character referred to above wherein the matrix can be flexible or substantially rigid and dimensionally stable.

Yet another object and feature of this invention is to provide a structure of the character referred to above which is such that the armor can be established in the form of flat panels or can be formed and/or molded in various predetermined shapes, as circumstances require.

Still another object and feature of our invention is to provide improved armor comprised of two or more armor laminates, each of which armor laminates is comprised of one or more layers or laminates of ballistic fabric and particulate metal abrading material within a matrix of flexible, plastic or dimensionally stable resin.

It is an object of this invention to provide an effective and dependable armor wall structure including layers of laminates of ballistic fabric wherein the fabric is supported by and hermetically sealed within a resinous matrix.

The foregoing and other objects and features of our invention will be apparent and will be fully understood from the following detailed description of typical preferred forms and embodiments of our invention, throughout which description reference is made to the accompanying drawings in which:

FIG. 1 is an isometric view of a piece of ballistic fabric with particulate metal abrading material to it:

FIG. 2 is an enlarged detailed sectional view taken substantially as indicated by line 2—2 on FIG. 1;

FIG. 3 is a view similar to FIG. 2 showing the structure of FIG. 2 in a resinous matrix with a filler of metal abrading material and establishing an armor laminate;

FIG. 4 is a view showing two armor laminates in assembled relationship;

FIG. 5 is a view similar to FIG. 3 showing an armor laminate comprising three layers of ballistic fabric within a resinous matrix having a filler of metal abrading material;

FIG. 6 is an illustrative view of metal abrading material comprising irregular shaped particles;

FIG. 7 is an illustrative view of metal abrading material comprising substantially regular, bead-shaped particles;

FIG. 8 is an enlarged view showing a bead shaped particle of abrading material in its normal form and showing it in a fractured or broken form;

FIG. 9 is a view showing of one irregular shape in which our improved armor can be formed;

FIG. 10 is a sectional view illustrating a unitary armor structure including fourteen laminates of ballistic fabric;

FIG. 11 is a sectional view illustrating an armor structure comprising three armor laminates, each including four layers of ballistic fabric; and FIG. 12 is a view illustrating the manner in which the armor structure shown in FIG. 5 stops a projectile.

The basic armor structure provided by the present invention includes an armor panel or wall W with front and rear surfaces 10 and 11 and comprising a matrix R of resinous material, one or more layers or laminates L of the ballistic fabric F within the matrix R and a filler of metal abrading means M comprising a multiplicity of particles of metal abrading material within and carried by the matrix R and by the fabric F.

The fabric F establishing the laminates L is a normally flat, flexible and rather loosely woven fabric of special fibres such as is shown in FIG. 1 of the drawings.

The fibres of the fabric F and the weave of the fabric impart into the fabric a high and notable capability to slow and stop projectiles, such as bullets and shrapnel, directed toward and which impinge upon, for example, the front surface of the fabric, at high velocity.

The ability and/or characteristics of armor or other structures to slow and to stop projectiles is commonly referred to as the ballistic capabilities and/or characteristics of such structures and/or materials. In the art of armor, those materials which are employed in the establishment of armor because of their good projectile slowing and/or stopping characteristics are commonly qualified by the term "ballistic". In accordance with the foregoing and since the fabric employed in carrying out this invention is possessed with and is utilized because of its good or excellent ballistic characteristics, it will be qualified and referred to as ballistic fabric throughout this disclosure.

At present, the most effective ballistic fabrics that we have knowledge of and have used in armor structures comprised of or in which ballistic fabrics are employed, are fabrics woven of that long chain polyester resin fibre produced by Du Pont de Nemours E. I. and Co. and sold under the tradename Kevlar.

Kevlar fibres are produced and sold by Du Pont in the form of roving and yarns of various Denier and are woven into many different weaves of fabric by various weavers.

In the past, the Denier and weaves of Kevlar ballistic fabrics which were available to us were such that their ballistic characteristics were most effective when the fabrics were loosely held and capable of moving and bodily yielding in advance of impinging projectiles. Those fabrics were such that their ballistic characteristics were adversely affected and materially diminished when the fabrics were firmly and securely held against displacement by impinging projectiles. For example, if those fabrics were imbedded or bonded within a wall or matrix of some substantially dimensionally stable plastic or resin, their ballistic characteristics were so diminished that the ballistic characteristics and effectiveness of the resulting armor structure was oftentimes marginal.

As a result of the foregoing, it was believed that in armor structures in which the principal ballistic medium was ballistic fabric, all of some of that fabric must or should be loosely and freely supported within the armor structure in order to gain the maximum potential ballistic effect afforded thereby and to provide a safe, dependable and effective armor structure.

The principal shortcoming in armor structure of the character referred to above resides in the fact that the loosely held or supported ballistic fabric is difficult to hold in place; it takes up excessive space and is subject to becoming wetted by and to hold substantial amounts of water or moisture. When the ballistic fabric in such armor is wetted by water, the weight of the armor is or can be increased materially. Further, the presence of water or moisture creates a number of other potentially serious problems, such as the growth of mildew or mold within the armor structure and the establishment of electric conductive fields within and throughout the armor.

In the recent past, certain new grades of ballistic fabric woven of Kevlar fibre have become known and made available to us. These new fabrics have been tested and have proven to have ballistic characteristics which are superior to those characteristics of those ballistic fabrics which we had previous knowledge and had used.

The new ballistic fabrics noted above are such that when bonded within and securely held by a resinous matrix which is normally dimensionally stable and in which a filler of metal abrading particulate matter is carried, they make possible the establishment of highly effective armor structures utilizing ballistic fabrics, in which no ballistic fabric need be loosely supported or held.

One preferred ballistic fabric used in carrying out our present invention is 1500 Denier 2×2 basket weave Kevlar fabric, produced and sold by Fabric Deliveries, Inc. of Carbondale, Pa.

Another quality or grade of ballistic fabric suitable for use in establishing armor embodying the present invention and produced by the same fabric weaving company is 1000 Denier, 31×31 Kevlar fabric.

The last noted ballistic fabric has poorer ballistic characteristics than the first noted fabric but is substantially lighter, thinner and less expensive than the first noted fabric.

In furtherance of our present invention, various resins and certain other moldable materials which are normally structurally stable when cured or set up have been effectively used. The following are inclusive but not exclusive of materials that have been and can be used in establishing the matrix R of our invention; casein-based white glue, shellac, latex-based cements, polyethylene, polyvinylchloride, polyvinylacetate, cross-linked polymer such as melamin and phenolic, polycarbonate, ABS type II polymer and various epoxy resins. In practice, substantially any material which is compatible with Kevlar and the metal abrading filler material employed in establishing our armor and which is capable of supporting the Kevlar fabric and abrading material in a stable manner can be used. The fabric laminate or laminates L within the matrix R and the metal abrading material within the matrix make it practical and possible to use many materials to establish the matrix which, by themselves, might be structurally unsound and/or would not afford desired dimensional stability.

The particulate abrading material used in carrying out the present invention need only be of sufficient hardness and of a character that it will readily abrade the surfaces of projectiles urged into contact with it and moving relative to it at high speed. Tests have determined that Portland Cement dust is an effective abrading material for rather low velocity malleable lead bullets, while Boron carbide appears to establish the most effective abrading means for high velocity steel bullets and/or fragments.

In selecting the metal abrading material used in carrying out our invention, special consideration should be given to the weight and cost of the material in light of the use to which the armor is to be put; that is, the type of projectile the armor will be required to stop and the nature of the object which is to be protected by the armor.

For example, Boron carbide has higher impact strength and is lighter than alluminum oxide but is substantially more costly than alluminum oxide. Accordingly, where the added strength and light weight of Boron carbide justifies the greater cost of that material, it should be used in preference to alluminum oxide. However, where costs, strength and weight are of no special concern, the alluminum oxide or some other suitable metal abrading material which is less costly and easier to work might be preferred.

While the particles of most metal abrading particulate materials suitable for use in establishing our metal abrading means M are of irregular shape, such as is illustrated in FIG. 6 of the drawings, tests have been made with embodiments of our new armor in which the metal abrading material is established of those small tempered glass beads produced by Minnesota Milling and Mining Company for establishing light reflecting surfaces and sold under the tradename Scotch Light. When these substantially spherical or ovoid hardened glass beads are arranged in the matrix of our armor, in substantial bridging contact with each other and are impinged upon by a projectile traveling at high speed, the beads adjacent or in close proximity to the projectile fracture into pieces having sharp, hard, cutting edges and corners which are disposed toward, engage and effectively abrade the surfaces of the projectiles.

In FIG. 7 of the drawings, I show a typical mass of glass beads such as would go to make up the means M. FIG. 8 of the drawings shows an enlarged bead in its normal substantial spherical shape and in a broken or fractured condition.

The glass bead material noted above is light, inexpensive and is sufficiently hard and strong for effective use in establishing the metal abrading means M in most armor intended for use as body protection against projectiles fired by small arms. An end to be gained through the use of the above and similar, hard, regularly shaped material resides in the fact that when combined or mixed with a resin, in fluid state, and preparatory to injection molding or otherwise forming that resin into a structurally stable matrix of desired shape, it does not interfere with the free flow and forming of the resin to any appreciable extent. Further, when the beads of the material are unbroken and round or ovoid, they have little or no abrading capability and are such that they will not cut or wear away the injection nozzles, molds and other parts of injection molding equipment with which they might come into contact. Still further, due to the relative round and uniform shape of the beads, they will not cut or abrade the fabric fibres and when in bridging contact with each other, they form interstices through which fluid resin material combined therewith, preparatory to establishing the matrix M, can freely flow. Accordingly, this form of abrading means permits easy and free forming of the matrix and is such that it will not, under normal conditions, trap and hold air or gases in such a way as to adversely affect the structural integrity of the finished armor structure. Further, such material is such that it will not cut or damage the fabric or any other structure it might come into contact with during normal use thereof.

While we have specifically noted Boron carbide, alluminum oxide, Portland cement and tempered glass beads, as examples of materials suitable for establishing our metal abrading means M, it will be apparent from those examples that many other materials such as silica-sand, garnet sands, tungsten carbide and various other hard particulate materials capable of effectively abrading the surfaces of metal projectiles can be employed without departing from the spirit of this invention.

In the preferred carrying out of the invention, sufficient particulate metal abrading material is provided so that the particles are in substantial bridging contact with each other. This condition and/or relationship of parts is desirable so that voids or openings in the means M and through which a projectile might travel freely are not present in the structure and so that adjacent contacting particles of the means M are in supported engagement with each other and such that each backs up another under applied forces. This assures that those particles engaging the surfaces of projectiles will not be readily displaced thereby without having abraded the opposing surfaces of the projectiles.

It has been determined that in carrying out the present invention particularly where the matrix R is established of a substantially strong, dimensionally stable resin, the mass of resin should not be greater than about one-quarter the mass of the ballistic fabric going to make up the armor. If the mass of the matrix R is greater than 25% of the mass of the fabric, the ballistic characteristics of the armor structure becomes notably less effective. This appears and is believed to be due to the fact that though the fabric is normally firmly held and supported within the matrix, the fabric is the principal ballistic medium or part of the construction and, to be effective, must be capable of yielding and moving in advance of an impinging projectile to some notable or appreciable extent. Accordingly, and so as not to prevent the fabric from moving or yielding in the manner set forth above, the yield strength of the matrix when reinforced by the fabric and abrading material of the means M should not exceed the tear strength of the fabric when bonded within and supported by the matrix. While the ratio of the mass of the matrix to the mass of fabric required to stay within the limits of the conditions set forth above will vary according to the Denier and weave of the fabric, the hardness and structural stability of the material establishing the matrix, and the physical make-up of the particulate material going to make up the means M, it has been determined that so long as the mass of the matrix R does not exceed one-quarter or 25% of the mass of the fabric, limits of the noted desired condition will not, under ordinary circumstances, be exceeded.

In practice, the volume of the resin going to make up the matrix and the volume of the particulate matter going to make up the means M, combine to establish a sufficient volume of material to adequately and completely impregnate, cover and encapsulate the fabric.

In armor, wherein the means M is established with the above noted tempered glass beads, superior ballistic effects have been attained than were attained by similar armor wherein the means M was established of irregular shaped particulate material, the hardness of which was at least equal to the hardness of glass beads. It was observed that the armor including the bead material was normally nearly as rigid and structurally stable as the armor including the irregular material, but that upon applied forces of impinging projectiles, the armor including the beaded material yielded more readily and to a notably greater extent than the other armor and was notably more resilient than said other armor. These beneficial results were attributed to the fact that the beaded material when in bridging contact is inherently more fluid and will move more readily than irregular shaped material in similar contact and that the round or ovoid bead-like material is a great deal stronger, structurally and can support substantially greater applied forces than similar irregular shaped particulate material. That is, a barrier of hardened glass beads in bridging contact is more fluid, and notably stronger under applied loads, than a barrier of hardened glass particles of irregular shape, in bridging contact.

In furtherance of the present invention, the armor that we provide can take various forms.

In one basic form and carrying out of the invention, as shown in FIG. 4 of the drawings, an armor structure is established of two or more armor laminates A, arranged in surfact to surface contact with each other and bonded or cemented together as at C, to establish the unitary armor wall W'. Each armor laminate A includes a single layer or laminate L of ballistic fabric F arranged and supported within a matrix R with inner and outer surfaces 10 and 11 and which includes a filler of metal abrading particulate material. The mass of the matrix is preferably equal to about 20% of the mass of the fabric going to make up the armor.

Each armor laminate A has a certain predetermined ballistic capability. That is, a predetermined ability or capacity to slow and/or stop impinging projectiles of particular mass, having a particular impinging surface area and traveling at a particular velocity. By assembling a suitable number of armor laminates A, an armor structure having a desired predetermined ballistic or projectile stopping capacity can be easily and effectively established.

A noted advantage to be found in establishing our armor in the manner set forth above resides in the fact that each armor laminate A, though supported and backed by adjacent laminates going to make up the armor, is substantially free to flex or yield and to expend its ballistic effect on impinging projectiles independently of the other laminates. More briefly stated, such a structure is imparted with substantially greater desired flexibility than a unitary or single armor laminate including an equal total number of ballistic fabric laminates and mass of matrix.

Another advantage in the above armor structure resides in the fact that the armor laminates A can be made strong and dimensionally stable yet extremely thin and flexible, whereby they can be easily and conveniently bent or flexed into engagement in and/or about a structure to be protected during the assembly of the armor structure and are such that when the armor is assembled, a structurally sound and dimensionally stable armor wall structure is established.

In furtherance of the present invention, the several laminates A going to make up the armor wall structure, while similar in basic form and construction, can be established with dissimilar ballistic fabrics, abrading materials and matric materials, each selected for its special ballistic characteristics.

For example, the forward most laminate A might include a combination of costly and heavy ballistic fabric and abrading material which is best suited to abrade and deform the copper jackets of jacketed bullets, while an inner or rear laminate A might include a less costly and lighter combination of ballistic fabric and abrading material which is adequate and suitable for stopping the lead core and copper fragments of such bullets which have been worked upon by the first laminate.

Another form and embodiment of our invention shown in FIG. 5 of the drawings, includes an armor laminate or wall $W^2$ including a substantially dimensionally stable resin matrix $R^2$ with front and rear surfaces 10 and 11 and carrying a filler of metal abrading material $M^2$, and a plurality of ballistic fabric laminates $L^2$. In the form of the invention illustrated, three fabric laminates $L^2$ are included.

In this form of the invention, the ballistic fabric laminates $L^2$ can be established of the same ballistic fabric or can be established of dissimilar ballistic fabrics, each selected for its special or unique ballistic characteristics and arranged within the matrix $R^2$ so that the fabric laminates work upon impinging projectiles and expend their ballistic capability in a predetermined sequence.

Further, the material of the metal abrading material $M^2$ can be a single material, a mixture of different metal abrading materials each selected for its special metal abrading characteristics or can be a selected combination of such materials arranged to occur primarily within the weave and at the surfaces of particular related fabric laminates $L^2$.

The armor laminate or wall structure $W^2$ shown in FIG. 5 and described above is such that it results in a less flexible and/or rigid and dimensionally more stable wall structure than does the first form of the invention made up of a plurality of thin armor laminates including but one or two fabric laminates and is a structure which lends itself and is particularly suited to being formed or molded as by means of injection molding apparatus into complex configurations, such as helmets H, as is illustrated in FIG. 9 of the drawings.

It will be apparent that if desired and when circumstances require, the number of fabric laminates included in the form of armor structure shown in FIG. 5 of the drawings can be increased so as to increase the ballistic characteristics of the resulting armor wall structure and to meet certain ballistic requirements.

FIG. 10 of the drawings illustrates such an armor wall structure $W^3$ including 13 fabric laminates L-13 in a single or unitary matrix $R^3$ having a filler of metal abrading material.

In practice, while there appears to be practical limits as to the number of ballistic fabric laminates that can be included in a single matrix, such limits appear to be dependent upon a number of factors which determine or control the flexibility and/or elasticity which is built into the armor structure and which permits the armor and its fabric laminates to move, delaminate and yield in advance of impinging projectiles. Such factors, for example, include the hardness and structural stability of the material employed to establish the matrix, the planar expanse of the resulting armor wall structure and the size, weight and velocity of projectiles it is intended to stop.

It has been calculated that armor wall structures established with a matrix of soft, flexible resin such as plasticized polyvinylchloride, including a filler of rather fluid metal abrading particulate material (such as glass beads) and having several square feet in surface area, can carry and effectively support as many as 40 ballistic fabric laminates.

By selecting and combining appropriate ballistic fabrics and metal abrading materials, it is believed and appears evident that such armor wall structures can be made to effectively stop large caliber machine gun bullets and light or small caliber cannon projectiles.

A most effective form of armor that we provide is diagrammatically illustrated in FIG. 11 of the drawings. This form of armor comprises a plurality, for example, three, structurally self-supporting armor laminates or panels P, $P^2$ and $P^3$ arranged in parallel planes and spaced apart a sufficient distance so that each panel is free to flex and yield in advance of a projectile impinging upon it, substantially independent of each of the other panels occurring rearward of it.

It has been observed that in armor laminates or panels of the character here provided, the greatest ballistic or projectile slowing and stopping effect is attained upon initial contact of the projectiles with the forward surfaces of the panels and as the panels commence to yield rearwardly in advance of the projectiles.

As the panels yield rearwardly in advance of impinging projectiles and their elastic limits are reached, their projectile slowing and stopping abilities or ballistic characteristics diminish.

With the armor structure shown in FIG. 11 of the drawings, the maximum ballistic effect or capability of each armor panel is effectively put to work and is utilized. Preliminary tests of this last form of our invention indicate and/or show that such an armor structure has notably superior ballistic characteristics than a unitary armor wall structure such as is shown in FIG. 10 of the drawings and which includes an equal or greater number of ballistic fabric laminates and equal amounts and/or quantities of matrix and metal abrading materials.

This last form of our invention is particularly suitable and effective to slow and stop steel or steel jacketed, high velocity armor piercing bullets. When such bullets are directed toward and engage the armor structure now under consideration, the forwardmost and first to be engaged laminate $P^1$, though ineffective to stop the bullets, works upon the bullets to slow and deform them to a material extent and normally deflects or changes their direction of travel. The second laminate $P^2$ normally further slows, further deforms and often stops such bullets. If the second laminate $P^2$ does not stop the whole or any fragmental parts of such bullets, the rearmost or third laminate $P^3$ does.

The laminate $P^3$ may be caused to yield but it is not penetrated by such bullets. In practice, and to gain the operative effects set forth above, the number of spaced armor laminates or panels may be reduced to two or increased to four, five or more such panels, depending upon the ballistic characteristics which are imparted or built into each of the armor panels used and the cumulative ballistic effect sought to be gained.

In FIG. 12 of the drawings, we have illustrated the manner in which an armor wall structure $W^1$ embodying our present invention works upon a bullet 13 to deform, slow and stop the bullet. It is to be noted that the bullet enters the armor wall structure $W^1$ and that the wall structure yields in advance of the bullet B as it works to deform, slow and stop the bullet.

In practice, while the material of the matrix R might have some limited or even some substantial ballistic effect, the principal work of slowing and stopping bullets is performed by the ballistic fabric laminates within the matrix. The ballistic effect of the fabric laminates is imparted into the fabric by the strength of the fibres and by the denier and the weave of the fabric. The weaves of the ballistic fabrics that we employ afford multi-directional stretching of the fabrics which permit the fabrics to stretch or yield in advance of impinging bullets.

The effectiveness of the fabrics to slow and/or stop projectiles is greatly dependent upon the ability of the fabric fibres to frictionally engage and/or establish an effective mechanical grip on and with the surfaces of the projectiles and to thereby prevent the projectiles from sliding by and displacing the fibres in such a manner as to create a passage through the fabric in advance thereof. The metal abrading means that we provide is effective to abrade and condition the surfaces of the projectiles or bullets moved into engagement with the armor so that the fibres of the fabric which are engaged with the conditioned surfaces of the or bullets securely engage and grip the projectiles or bullets. Such secured engaging and gripping between the fibres and bullets permit the kinetic energy of the bullets to be effectively transmitted into the fibres of and throughout the fabric.

While the abrading means functions to condition the surfaces of the bullets or projectiles as noted above, it also functions to securely and substantially fixedly imbed particles of the abrading material into the surfaces of the projectiles or bullets which particles engage and hook onto the fibres of the fabric as the bullets or projectiles advance into engagement therewith and to thereby lock or secure the fibres and projectiles together.

Still further, the accumulative effective mass of the bridging particles of hard and strong abrading material of the means M which oppose and counteract the masses of impinging projectiles, is substantial and is such that the means M works effectively to absorb and disburse much of the mass inertia of the projectiles impinging upon the armor and causes substantial flattening and/or deformation of the projectiles.

The support afforded to the material of the means M by both the matrix and the ballistic fabric related to it enhance its above noted ballistic characteristics.

It is to be noted that in each of the several forms of our new armor illustrated in the drawings and described above, the ballistic fabric laminates are wholly within their related matrices to be securely supported thereby and are sealed and protected from the elements of the environment in which the armor is used.

Further, our new armor is such that it can be established in both flexible and in rigid, structurally stable, self-supporting forms. Still further, our new armor is such that it can be effectively established in the form of simple, flat panels or the like and can be formed or molded in both flexible and rigid structures of special and complex forms.

Having described only typical preferred forms and applications of our invention, we do not wish to be limited to the specific details herein set forth, but wish to reserve to ourselves any modifications and/or variations that may appear to those skilled in the art and which fall within the scope of the following claims.

Having described our invention, we claim:

1. An armor laminate structure comprising a resin matrix with oppositely disposed front and rear surfaces and containing a filler of metal abrading particulate material and flexible woven ballistic fabric in supported engagement within the matrix and particulate material.

2. The armor laminate set forth in claim 1 including a single layer of ballistic fabric in spaced relationship between the said front and rear surfaces.

3. The armor laminate set forth in claim 1 including a plurality of layers of ballistic fabric in spaced relationship between the said front and rear surfaces.

4. The armor laminate set forth in claim 3 wherein certain layers of ballistic fabric are established of different yarn and of different weave and have different ballistic characteristics than certain of the other layers of ballistic fabric and wherein different ballistic fabrics are in predetermined sequential arrangement within the matrix and between the front and rear surfaces thereof whereby different layers of fabric work upon projectiles moved into contact with and entering the structure in predetermined sequential order.

5. The armor laminate set forth in claim 3 wherein the particulate metal abrading material in the matrix adjacent and related to certain layers of ballistic fabric is of different hardness, strength and size and has different metal abrading characteristics than the particulate metal abrading material adjacent and related to certain of the other layers of ballistic fabric and wherein said different metal abrading materials are arranged in predetermined sequence within the structure between the front and rear surfaces of the matrix whereby the different particulate materials work upon projectiles engaging and entering the structure in predetermined sequence.

6. The armor laminate set forth in claim 4 wherein the particulate metal abrading material in the matrix adjacent and related to certain layers of ballistic fabric is of different hardness, strength and size and has different metal abrading characteristics than the particulate metal abrading material adjacent and related to certain of the other layers of ballistic fabric and wherein said different metal abrading materials are arranged in predetermined sequence within the structure between the front and rear surfaces of the matrix whereby the different particulate materials work upon projectiles engaging and entering the structure in predetermined sequence.

7. The armor laminate set forth in claim 1 wherein the metal abrading particulate material is a hard brittle material in the form of substantially ovoid shaped particles which break into irregularly shaped fragments with metal abrading corners and edges under the impact forces of projectiles directed thereon.

8. The armor laminate set forth in claim 7 wherein the resin matrix is flexible.

9. The armor laminate set forth in claim 7 wherein the resin matrix is non-flexible and frangible.

10. The armor laminate set forth in claim 1 wherein the mass of the resin matrix does not exceed one-quarter the mass of the ballistic fabric.

11. An armor barrier comprising a plurality of armor laminates, each laminate comprising a resin matrix with oppositely disposed front and rear surfaces and containing a filler of metal abrading particulate material and flexible woven ballistic fabric in supported engagement within the matrix and particulate material; said laminates are arranged with adjacent surfaces in opposed relationship.

12. The armor set forth in claim 11 wherein each armor laminate is moveable rearwardly relative to the other armor laminates forward thereof.

13. The armor set forth in claim 11 wherein each armor laminate is in surface to surface supporting engagement with the armor laminates adjacent to it.

14. The armor set forth in claim 13 wherein adjacent laminates are cemented together.

15. The armor set forth in claim 11 wherein each laminate includes a single layer of ballistic fabric in spaced relationship between the front and rear surfaces of its related matrix.

16. The armor set forth in claim 11 wherein each laminate includes a plurality of layers of ballistic fabric in spaced relationship between the front and rear surfaces of their related matrix.

17. The armor set forth in claim 16 wherein certain layers of fabric of each laminate are established of different yarn and of different weave and have different ballistic characteristics than certain of the other layers of ballistic fabric and wherein different ballistic fabrics are in predetermined sequential arrangement within the matrix and between the front and rear surfaces thereof whereby different layers of fabric work upon projectiles moved into contact with and entering the structure in predetermined sequential order.

18. The armor laminate set forth in claim 16 wherein the particulate metal abrading material in the matrix adjacent and related to certain layers of ballistic fabric in certain laminates is of different hardness, strength and size and has different metal abrading characteristics than the particulate metal abrading material adjacent and related to certain of the other layers of ballistic fabric and wherein said different metal abrading materials are arranged in predetermined sequence within the laminate structure between the front and rear surfaces of the matrix whereby the different particulate materials work upon projectiles engaging and entering the structure in predetermined sequence.

19. The armor set forth in claim 18 wherein certain layers of fabric of each laminate are established of different yarn and of different weave and have different ballistic characteristics than certain of the other layers of ballistic fabric and wherein different ballistic fabrics are in predetermined sequential arrangement within the matrix and between the front and rear surfaces thereof whereby different layers of fabric work upon projectiles moved into contact with and entering the structure in predetermined sequential order.

* * * * *